United States Patent [19]

Haubner et al.

[11] 4,298,930

[45] Nov. 3, 1981

[54] APPARATUS FOR DATA TRANSFER TO MICROPROCESSORS

[75] Inventors: Georg Haubner, Berg; Jürgen Wesemeyer, Nuremberg; Hans Schrumpf, Oberasbach, all of Fed. Rep. of Germany

[73] Assignee: Robert Bosch GmbH, Stuttgart, Fed. Rep. of Germany

[21] Appl. No.: 20,225

[22] Filed: Mar. 13, 1979

[30] Foreign Application Priority Data

Apr. 1, 1978 [DE] Fed. Rep. of Germany ....... 2814124

[51] Int. Cl.³ .............................................. G06F 3/00
[52] U.S. Cl. ............................................... 364/200
[58] Field of Search ... 364/200 MS File, 900 MS File; 340/166 R; 307/239, 241, 243; 179/18 GE, 18 GF

[56] References Cited

U.S. PATENT DOCUMENTS

| Re. 27,285 | 2/1972 | Dreyer et al. | 364/200 |
|---|---|---|---|
| 3,581,286 | 5/1971 | Beausoleil | 364/200 |
| 3,760,358 | 9/1973 | Isii et al. | 340/166 R X |
| 3,772,651 | 11/1973 | Thyssens | 340/166 R X |
| 4,085,403 | 4/1978 | Meier et al. | 340/168 R |
| 4,155,075 | 5/1979 | Weckenmann et al. | 340/167 R |
| 4,160,238 | 7/1979 | Weckenmann et al. | 340/147 R |
| 4,164,730 | 8/1979 | Weckenmann et al. | 340/168 R |

Primary Examiner—Gareth D. Shaw
Assistant Examiner—Thomas M. Heckler
Attorney, Agent, or Firm—Frishauf, Holtz, Goodman & Woodward

[57] ABSTRACT

In order to permit alternate transfer of different sets of data to a microprocessor over the same input/output lines, a coupling-decoupling circuit includes series-connected diodes and inverters. The input/output lines are coupled to a diode matrix which is scanned line-by-line and determines the transfer of a set of primary data in a first time interval during which the admission of supplementary data from secondary data lines is blocked. In a second time interval, the rows of the diode matrix are all placed in the same logical state while the supplementary data is admitted by the coupling-decoupling circuit to the same input/output lines which received the primary data.

7 Claims, 3 Drawing Figures

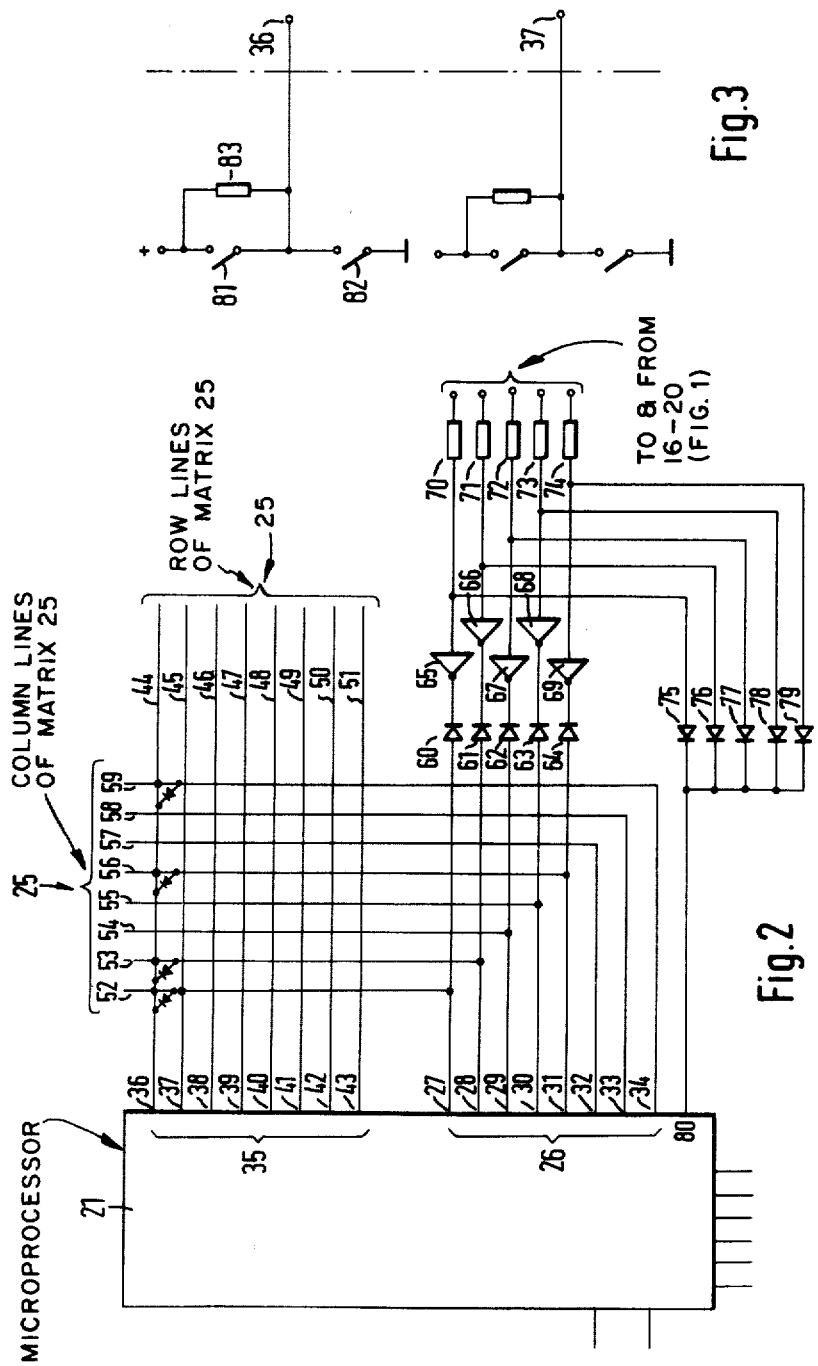

APPARATUS FOR DATA TRANSFER TO MICROPROCESSORS

FIELD OF THE INVENTION

The invention relates to the input and output of data to and from microprocessors with static input/output terminals, especially for programmable, multiple receivers of multiplex systems in motor vehicles, and is particularly applicable to systems described in U.S. Pat. No. 4,085,403, Meier, assigned to the assignee of this application.

BACKGROUND OF THE INVENTION AND PRIOR ART

Devices for applying data to the same input terminals of a microprocessor at different times are known. In these devices, the individual data lines are decoupled by means of expensive switches, for example, tri-state logic components. These switches add complexity and expense and constitute a source of malfunction.

THE INVENTION

It is a principal object of the present invention to provide apparatus for applying data to a microprocessor in which the individual data lines are de-coupled in a simple manner, requiring only a relatively small number of logical inverters. An associated object of the invention is to provide an apparatus which is substantially less complicated and less expensive than the known apparatus.

Briefly, in accordance with the invention the rows and columns of a diode matrix are connected to respective sets of input lines of the microprocessor so that data may be entered into the microprocessor during a first time interval. One of the two sets of matrix lines, for example the column matrix lines, is then connected to individual lines, each containing the series connection of a diode and a logical inverter, on which supplementary data is carried. The inputs of the inverters are connected via individual diodes to an output line of the microprocessor in order to block the passage of data through the inverters during the first time interval, when the diode matrix is being scanned line-by-line. Subsequent to the scanning of the diode matrix line by line, the row inputs of the matrix are supplied with a logical 1 signal while the inverters are opened and supplementary data may flow into the microprocessor.

An advantageous feature of the invention is that the diodes in the diode matrix are switchable and the matrix is freely programmable.

Still other features and advantages of the invention will emerge from the description of a preferred exemplary emobodiment, read together with the drawing.

DRAWINGS

FIG. 2 is a schematic circuit diagram of the microprocessor and the associated circuitry in a single receiving station; and FIG. 3 is a diagram illustrating the internal input/output connections in a commerical microprocessor.

DESCRIPTION OF THE PREFERRED EMBODIMENT

Figure 1:
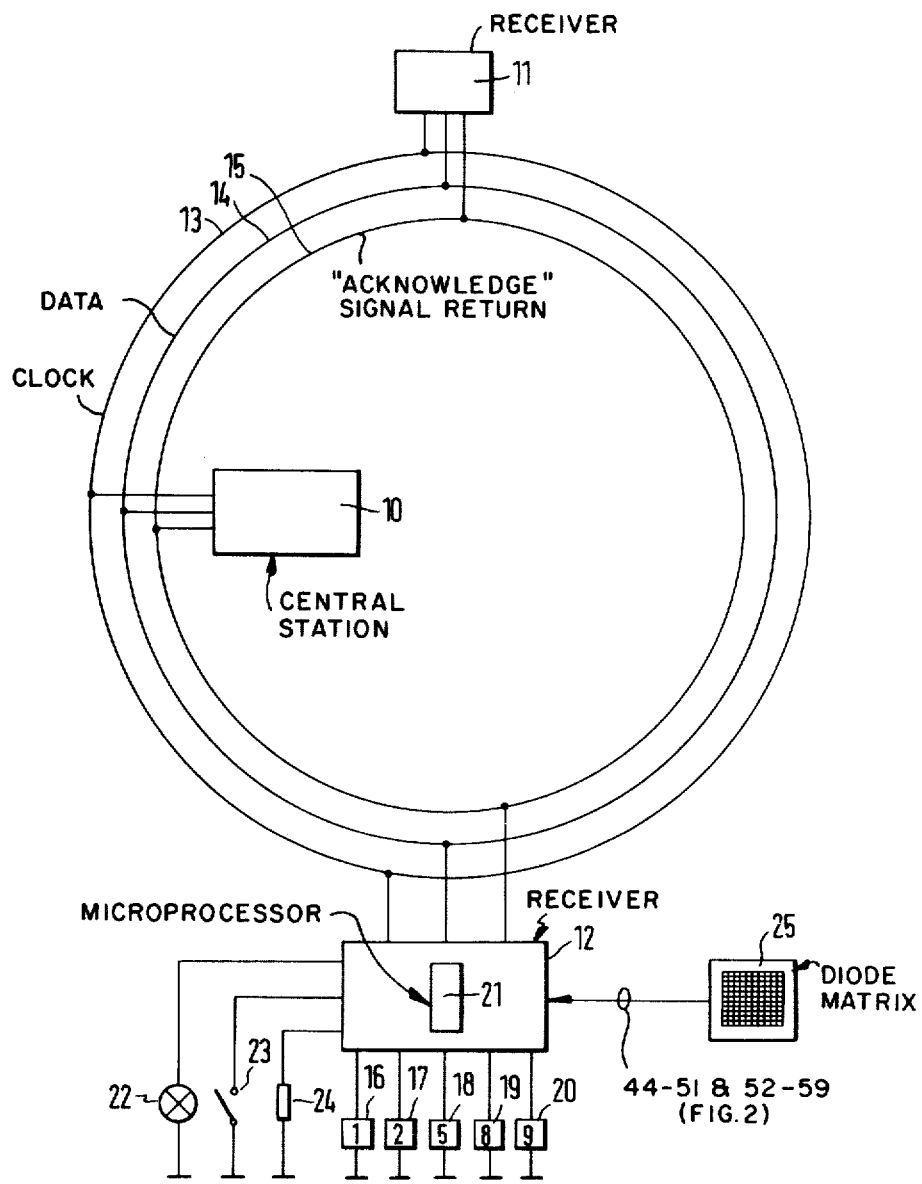
FIG. 1 is a schematic illustration of a multiplex system with a central station and several receiving stations, for example in a motor vehicle.

FIG. 1 illustrates schematically a multiplex data system including a central station 10 and two "subscribers" 11, 12. The central station and the subscribers or receivers 11, 12 are connected via a clock line 13, a data line 14 and a "acknowledge" or "reply" or signal return line 15. Each of the receivers 11, 12 controls a number of installations, for example relays 16-20 and installations 22, 23, 24. These installations are controlled in accordance with the data received on the data line 14 from the central station 10. The relays 16-20 may be used to activate various accessories, e.g. headlights, turn signals, windshield wipers and the like. Each relay has a number which corresponds to particular signals transmitted via the data line 14. The receiver 12 is connected to a microprocessor 21 which processes the clock signals on line 13 and the data transmitted on the line 14 and which also transmits back to the central station 10 various acknowledgement or supplementary signals related to, e.g., the status of headlights 22, transducers 23, temperature-dependent resistors 24 and the like via the signal return line 15. In order to carry out the systematic transfer of control data to and from the various relays 16-20, the input lines of the microprocessor are connected to the rows and columns of a diode matrix 25 in which various points of intersection can be associated with the various relays so that the correct control signals are applied to the relays. For example, if the microprocessor operates with 64 operating steps, a sequence of 64 clock pulses will be received on the clock line 13 and this sequence will be periodically repeated. At the same time, the central station transmits parallel control signals on the data line 14. Assuming, for example, that the relay 16 has the value 1, the relay 17 the value 2, the relay 18 the value 5, the relay 19 the value 8 and the relay 20 the value 9, the actuation of the relay 16 must take place by transmission of a control signal over the line 14 at the same time as the first step in the clock sequence arriving on line 13. Similarly, the actuation of the relay 19 must take place at the arrival of a control signal in step with the eighth clock pulse, etc. The signal distribution to the microprocessor, i.e. the manner of associating a clock signal with a control signal, is determined by the diode matrix 25.

FIG. 2 is a schematic diagram of the interconnection of the external lines of the microprocessor 12. These lines are seen to include a first port, or group 26 of input/output lines 27-34 and a second port or group 35 of input/output lines 36-43. The column lines 52-59 of the diode matrix are connected, respectively, to the input/output lines 27-34 and the row lines 44-51 of the diode matrix are connected, respectively, to the input/output lines 36-43 of the microprocessor. The diode matrix 25 may be programmed in such a way as to associate particular control signals with the various relays 16-20. In the present example, the relay 16 is meant to respond to the control signal with the value 1. For this reason, the first intersection in the matrix, i.e. the intersection between the row 44 and the column 52, is established by the insertion of a diode. Similarly, the intersections 2,5,8 and 9 are provided with individual diodes, as illustrated. The programming of the diode matrix may be facilitated by initially providing diodes at all intersection points and, thereafter, for example after installation in a motor vehicle, severing the unwanted connections. However, the diode matrix may also be an array of receptacles in which diode plugs are inserted at the desired points. If each of the points of intersection is equipped with a diode and a series-connected switch, the programming of the matrix is especially convenient.

A principal aspect of the present invention is the provision of a set of diodes 60, 61, 62, 63 and 64 whose anodes are connected, respectively, to the input/output lines 27–31 and whose cathodes are connected, respectively, to the output connections of inverters 65, 66, 67, 68 and 69. The inputs of these inverters are connected in series with respective coupling resistors 70–74 in signal return lines, each of which may receive a particular signal related to the status of the respective installation 16–20 (FIG. 1), for example a sensor signal, a signal from a temperature-dependent resistor or the like, as indicated in FIG. 1. Further connected to the inputs of the inverters 65–69 are respective anodes of diodes 75–79 whose cathodes are joined and are connected to an output 80 of the microprocessor.

FIG. 3 is an illustration of the internal connection of typical input/output lines 36 and 37 of the microprocessor, e.g. the commercially available microprocessor Intel model 8048. The equivalent circuit diagram of FIG. 3 shows two series-connected controlled switches 81 and 82 which are placed between positive and negative (or ground) terminals. A resistor 83 is connected in parallel with the switch 81; in the commercial microprocessor of Intel type 8048, the resistor 83 has the value 50 kOhm. The circuit of FIG. 3 shown only for terminals 36, 37, is used to generate the logical signals 0 or 1 at all of the respective terminals 36–43. The 1-signal is generated when both switches 81, 82 are open and a 0-signal is generated when the switch 82 is closed. A short 1-pulse is generated by short-term closure of the switch 81.

Operation:

The operational program of the microprocessor 21 performs a sequential interrogation of the row lines 44–51 of the diode matrix 25. In the first step, a 0-signal is applied on terminal 36 of the port 35 and thereby to row line 44 of the diode matrix. The other terminals 37–43 receive a 1-signal. The diodes associated with the intersection points 1, 2, 5 and 8 are conducting. Accordingly, the 0-signal is transmitted via the column lines 52, 53, 56 and 59 to the input/output terminals 27, 28, 31 and 34, respectively, of port 26, whence it is transmitted to an internal register in microprocessor 21 for further processing.

In accordance with a feature of the invention, the terminals 27–31 of port 26 are isolated with respect to feedback or "reply" or "acknowledge" signals during the line-scanning of the diode matrix 25. To isolate the terminals 27–31 connected to installations 16–20, so that no feedback data can be received, the inverters 65–69 must be blocked during that time. This blockage is effected by a control signal on control terminal 80, in form of an 0-signal. This 0-signal is connected through diodes 75–79 to the inputs of the inverters 65–69. Accordingly, the outputs of the inverters exhibit a 1-signal which blocks the diodes 60–64 and decouples the resistors 70–74 in the signal return lines from the input/output terminals 27–31. No installations providing "acknowledge" signals are connected to terminals 32, 33, 34 of port 26 and hence no diode-inverter circuit controlled by terminal 80 of the microprocessor is needed therefor.

After the line-scan of the diode matrix 25 is complete, the input/output terminals 27–31 may be used for accepting feedback signals. Accordingly, the operating program of the microprocessor generates a 1-signal at its output 80, causing the inverters 65–69 to put out an 0-signal which unblocks the diodes 60–64 and permits the passage of return or reply or acknowledge or feedback signals from the installations 16–20 (FIG. 1) to the input/output terminals 27–31. These signals are then placed into an internal register in known manner. The signal return lines are connected, according to the program, to the matrix points 1, 2, 5 and 8 so that the feedback signals may be transmitted from the receiver 12 to the central station 10 upon the occurrence of appropriate control signals.

The immunity to spurious signals may be enhanced by the insertion of inverters, not shown, between the input/output terminals 36–43 and the diode matrix 25, the inverter inputs being connected to the terminals 36–43. This disposition is especially suitable when the various diodes at the intersection points 1, 2, 5, 8 and 9 are placed in the circuit by means of switches so that the inverters can supply an adequate amount of current.

During the time when the acknowledge or feedback signals are received, a 1/signal is applied to all row lines 44–51 of the diode matrix.

The apparatus of the invention permits the placement of different sets of data into a microprocessor at different times but over the same input/output terminals and from different data input lines. This capability is obtained without extensive decoupling circuitry. In the example described, only five inverters and their associated diodes are required. Accordingly, the apparatus of the invention may be produced at low cost and material usage.

Various changes and modifications may be made to the embodiment described within the scope of the inventive concept.

We claim:

1. An apparatus for transfer of data to and from a microprocessor (21), said microprocessor having a first set of input-output terminals (26; 27–34) and a control terminal (80) to control input/output operations;

said apparatus comprising a diode matrix (25) having a set of row lines and a set of column output lines (52–59) directly connected to said first set of microprocessor terminals (26; 27–34) for transferring primary data signals during a first time interval;

means (16–20) for generating supplementary signals representative of supplementary data coupling means (70–74) connected to said supplementary signal generating means;

and signal switching means (60–64; 65–69) controlled by signals from said control terminal (80) of said microprocessor to apply, selectively, the primary data during the first time interval or the supplementary data during a second time interval to respective terminals of said first set comprising a plurality of diodes (60–64) and a plurality of inverters (65–69) wherein respective input-output terminals (26; 27–34) are connected to the coupling means through the series connection of a respective one of said diodes and a respective one of said inverters;

and coupling elements (75–79) coupling said control terminal (80) of the microprocessor (21) to the input of said inverters;

and wherein the relative polarities of the primary data signals, the output from the control terminal of said microprocessor, the polarity direction of the diodes (60-64) and the direction of inversion of the inverters are so poled that, when said control terminal (80) carries a first logic signal (e.g.:"0"), the inverter and the diode prevent passage of supplementary data therethrough and when said control terminal (80) carries a second logic signal (then: "1") the inverter is effective to unblock the diode and permit passage of supplementary data therethrough for application to the respective terminal of said first set of terminals so that, by change of polarity of the control signal, supplementary data are, selectively, blocked from application to the terminals of the first set during said first time interval and thereby to admit said primary data to said microprocessor and admitting signals representative of supplementary data during the second time interval, spurious paths for said signals representative of supplementary data blocked by the diodes in the diode matrix.

2. An apparatus according to claim 1, wherein said diode matrix (25) includes provision for selective connection of the diodes therein, permitting arbitrary programming of said matrix.

3. An apparatus according to claim 1, wherein said microprocessor includes a second set of input/output terminals (36-43), each terminal being connected to a row (44-51) of said diode matrix (25);

and means (81, 82, 83) for generating a logic signal, and applying said logic signal to said second set of output terminals for transfer to each one of the rows of said diode matrix during said second time interval during which said supplementary data is admitted.

4. An apparatus according to claim 1, wherein said microprocessor has a second set of input/output terminals (36-43) each of which is connected to a row line of said diode matrix (25).

5. Apparatus according to claim 1, wherein the coupling elements comprise diodes poled to pass said first logic signal.

6. Apparatus according to claim 5, wherein the diodes forming said coupling elements have one terminal connected in common to said control terminal (80) of the microprocessor, and the respective other terminals, to respective inverters of said diode (60-64) and inverter (65-69) serial circuit.

7. Apparatus according to claim 5, wherein the means (16-20) generating the supplementary signals comprise a plurality of signal generating means (16-20);

a like plurality of serial diodes (60-64) and inverter (65-69) circuits are provided, each one of said serial circuits being connected to a respective one of input/output terminals (27-31) of said first set (26; 27-34) of terminals.

* * * * *